C. LEE.
TREATMENT OF RUBBER SOLES.
APPLICATION FILED FEB. 12, 1916.
1,232,573.
Patented July 10, 1917.
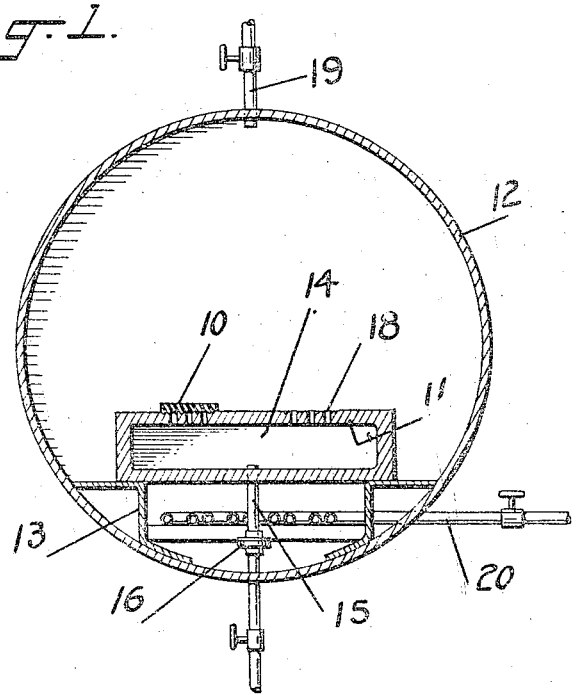
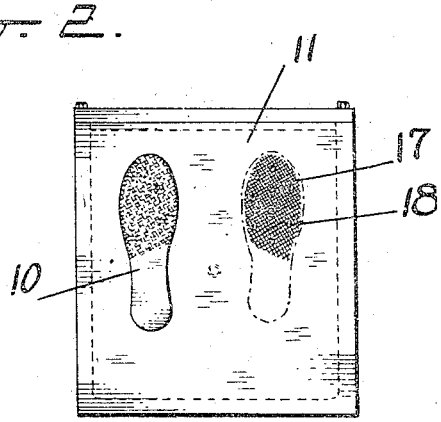
WITNESS:
INVENTOR
Clifford Lee
BY
HIS ATTORNEY

UNITED STATES PATENT OFFICE.

CLIFFORD LEE, OF NAUGATUCK, CONNECTICUT, ASSIGNOR TO THE GOODYEAR'S METALLIC RUBBER SHOE COMPANY, A CORPORATION OF CONNECTICUT.

TREATMENT OF RUBBER SOLES.

1,232,573.

Specification of Letters Patent.

Patented July 10, 1917.

Application filed February 12, 1916. Serial No. 77,815.

*To all whom it may concern:*

Be it known that I, CLIFFORD LEE, a citizen of the United States, residing at Naugatuck, county of New Haven, State of Connecticut, have invented certain new and useful Improvements in the Treatment of Rubber Soles, of which the following is a full, clear, and exact description.

This invention relates to improvements in methods of manufacturing rubber soles.

In the manufacture of one type of rubber sole, rubber compound is sheeted by calender rolls and the sheet is then cut or stamped in the desired shape to form the soles. Such soles may be successfully vulcanized in unattached or free condition by subjecting them while in the vulcanizer to heat and fluid pressure, the latter serving to prevent blowing or the formation of pores, blisters or the like, in the rubber.

One embodiment of the present invention consists in so treating soles of this type during the above described method of vulcanization, that their interiors will be exhausted and therefore a more compact product produced. A further object contemplates the imprinting of a desired design on the wear surface of such a sole.

The invention can be readily understood from the following description taken in connection with the accompanying drawing, in which—

Figure 1 is a cross-sectional view through apparatus suitable for carrying out the invention.

Fig. 2 is a detail plan view of the device for maintaining the soles in flat condition during vulcanization in accordance with my approved process.

In the practice of my invention I prefer to use soles of the calendered type, which briefly are produced as follows: The unvulcanized rubber is compounded with the desired ingredients in the usual manner upon mixing rolls. It is then formed into a sheet by passing it between calender rolls. The sheet of rubber containing material thus formed is then cut or stamped by suitable tools to form the soles, one of which is shown at 10.

In carrying out my invention, soles constructed as above described are disposed in flat, unattached condition upon a rigid, flat table 11, which may be removably secured within a vulcanizer 12, which preferably is pressure tight, by brackets 13. The table is formed with an interior chamber 14, which may be placed in communication with an exhaust pump through a valve controlled pipe 15 entering the vulcanizer, there being a coupling 16 in the pipe to permit application and removal of the table.

The table 11 is provided at localized points with communicating channels 17 which lead into ducts 18 that communicate with the chamber 14. These channels preferably constitute a complement of a design desired to be produced on the tread surface of each sole.

A fluid medium under pressure is admitted to the vulcanizer through a valve controlled pipe 19.

In practice, the soles are placed in the vulcanizer with their wear or tread surfaces in contact with the corresponding channeled parts of the table and with their attaching surfaces exposed. The fluid medium under pressure is admitted to the vulcanizer through the pipe 19, and presses the soles against the rigid, flat surface of the table, the latter resisting said pressure and maintaining the soles in flat condition. The subatmospheric pressure exerted within the chamber 14 through the pipe 15 coacts with the preponderating pressure of the medium on the attaching surface of each sole to withdraw entrapped gases, fluids, moisture and the like from the interior of the sole, the same finding easy exit through the communicating channels 17 and perforations 18 into the chamber.

Heat may be admitted to the vulcanizer to vulcanize the soles, through radiator pipes 20, or the fluid medium itself may constitute a heat medium as well as a pressure medium if desired. Under heat, during the early stages of vulcanization, the rubber becomes mobile and the tread surface of each sole is readily forced into the complement of the desired design, formed by the channels 17, under the influence of the differential of pressure exerted upon the sole. The rubber becomes set or fixed during vulcanization and retains the imprint of the design imparted by the channels 17.

I do not limit myself to the specific apparatus, specific channeled complement of a desired design on the soles, or other specific features of the apparatus as described, since a wide range of modifications may be employed in carrying out my improved process.

I do not limit the scope of the invention to the specific sequence of manipulation of the materials described, and consider that all processes embodying the step of maintaining soles in flat, unattached condition, and while in said condition subjecting them to a differential of pressure, falls within the scope of my invention.

By differential of pressure, I mean pressure conditions, such that a greater pressure is met by a lesser pressure through the intervening material under treatment.

Having thus described my invention, what I claim as new and desire to protect by Letters Patent is:

1. The process of treating soles of rubber containing material consisting of maintaining the sole in flat, unattached condition, and subjecting the sole to differential of pressure while in said condition.

2. The process of vulcanizing soles of rubber containing material consisting of maintaining the sole in flat, unattached condition, and subjecting the sole to heat and to a differential of pressure while in said condition.

3. The process of manufacturing soles consisting of sheeting rubber containing material, cutting the sheet to form soles, maintaining the soles in flat, unattached condition, and subjecting them to heat and to a differential of pressure while in said condition.

4. The process of giving final formation to unvulcanized rubber soles consisting of maintaining the same in flat, unattached condition with one surface in contact with a complement of a design desired on said surface, and subjecting the sole to a differential of pressure while in said flat, unattached condition.

Signed at Naugatuck, Connecticut, this 9th day of Feb., 1916.

CLIFFORD LEE.